No. 858,157. PATENTED JUNE 25, 1907.
A. G. DAY.
ROACH TRAP.
APPLICATION FILED FEB. 16, 1907.

UNITED STATES PATENT OFFICE.

ALBERT GEORGE DAY, OF PHILADELPHIA, PENNSYLVANIA.

ROACH-TRAP.

No. 858,157.      Specification of Letters Patent.      Patented June 25, 1907.

Application filed February 16, 1907. Serial No. 358,291.

*To all whom it may concern:*

Be it known that I, ALBERT GEORGE DAY, a citizen of the United States, and a resident of Philadelphia, in the county of Philadelphia and State of Pennsylvania, have invented a new and useful Roach-Trap, of which the following is a specification.

My invention relates to roach traps and has for its objects among others to provide a simple yet efficient and convenient form of trap having its mouth or entrance so constructed that when the roaches once get in they cannot get out.

Figure 1:
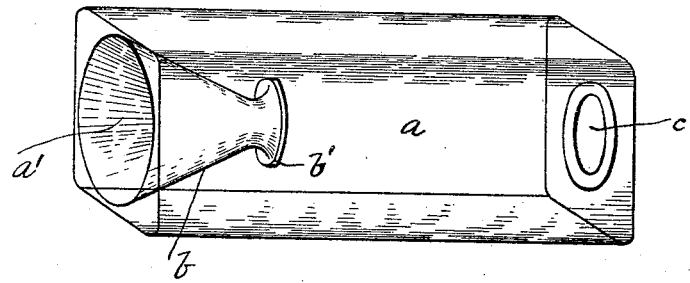
Figures 2, 3:
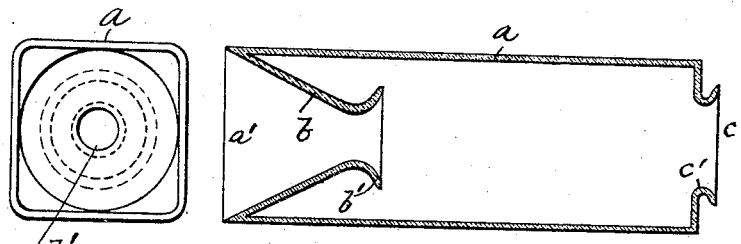

The invention is clearly illustrated in the accompanying drawings which, with the letters of reference marked thereon, form a part of this specification and in which Figure 1 is a perspective view of my improved trap. Fig. 2 is a central longitudinal section of the same. Fig. 3 is an end view.

Referring to the drawings it will be observed that the trap $a$ is substantially bottle shaped and although preferably square it will be evident that it may be of other shape. At one end it is formed with an entrance or mouth $a'$ which is annular and inverted or doubly inclined, its larger end extending from the outer walls of the body, forming an inwardly tapered portion $b$, and the outwardly flared portion $b'$ as seen clearly in the longitudinal section. This form of mouth or entrance facilitates and induces the ingress of roaches, the oppositely tapered or inclined inner end facilitating and aiding the dropping of the roaches into the trap and forming a material barrier to their egress therefrom. At the opposite end the body is formed with a flared opening $b$ which is designed to be corked or otherwise closed when the trap is in use said cork not being shown. The walls of this opening are tapered or rounded as seen at $c'$ so as to facilitate the removal of the roaches when desired. This opening provides shoulders within the body portion as seen in Fig. 2 at the right. It has also outwardly tapered walls outside the body portion. By this means the roaches cannot crawl into any position from which they can drop into the opening $b$ and escape.

The vessel or trap may be made of glass, or any other suitable material.

In use the trap is suitably baited and laid upon its side, the roaches entering through the inclined mouth to get at the food therein cannot get out and they may be destroyed in any suitable manner.

What is claimed as new is:—

As an improved article of manufacture, a roach trap comprising an elongated body portion having at one end an opening, having rounded walls and outwardly tapered outside the end of the body portion, and providing shoulders within the body portion and at the other end a mouth extending from the outer walls of said body inward within the same, inclinedly and having the end within the body oppositely tapered and held concentrically within the body out of contact with the walls of the latter.

Feby. 14th 1907.

ALBERT GEORGE DAY.

Witnesses:
     JOHN M. FREEMAN,
     ALBERT G. RICHARDSON.